June 24, 1930.  W. E. TRENT  1,767,779
APPARATUS FOR PRODUCING METALS FROM THEIR OXIDE ORES
Filed May 11, 1928  6 Sheets-Sheet 1

INVENTOR.
Walter E. Trent
BY Hoguet + Neary
his ATTORNEYS.

June 24, 1930. W. E. TRENT 1,767,779
APPARATUS FOR PRODUCING METALS FROM THEIR OXIDE ORES
Filed May 11, 1928 6 Sheets-Sheet 4

INVENTOR.
Walter E. Trent
BY Hoguet & Neary
his ATTORNEYS.

Patented June 24, 1930

1,767,779

UNITED STATES PATENT OFFICE

WALTER E. TRENT, OF NEW YORK, N. Y., ASSIGNOR TO THE TRENT PROCESS CORPORATION, A CORPORATION OF DELAWARE

APPARATUS FOR PRODUCING METALS FROM THEIR OXIDE ORES

Application filed May 11, 1928. Serial No. 276,862.

This invention relates to a metallurgical furnace for reducing oxide ores to their metals, and in particular to a furnace designed for the continuous production of pig iron from its oxides.

The invention contemplates in its broader aspects a furnace for the indirect heating of a mixture of ore and coal to at least partially reduce the ore and to substantially completely devolatilize the coal; and then subjecting the residue to a heated air blast to burn the carbonized coal particles therein and convert the reduced metal to a fluid state.

Other features of the invention include a furnace embodying means for the withdrawal of gases evolved in the smelting zone at a point intermediate the smelting and reducing zones and for burning the same with air to supply heat indirectly to the ore-coal mixture in the reducing zone and also, and preferably simultaneously, to preheat the air used in supporting combustion in the smelting zone. Means to secure the recirculation of spent combustion gases for the purpose of controlling the temperature in the reducing zone is also provided.

The invention has for a principal object the construction of a furnace for the simultaneous reduction of ore and the carbonization of coal for smelting the same under such conditions that valuable distillation products of the coal are recovered substantially without admixture with the diluent gases, such as carbon dioxide and nitrogen, that constitute a large proportion of the gases obtained in following the usual blast furnace practice.

Another object of the invention is to provide an apparatus in which the reducing and smelting operations can be conducted as a continuous process but under such conditions that the reduction of the ore and the smelting of the reduced metal are carried on in substantially distinct zones, the gaseous products evolved in the smelting zone being utilized to supply heat indirectly to the ore in the reducing zone.

Still another object of the invention is to provide heat transferring means to utilize the hot gases issuing from the smelting zone and the heat values therein in heating ore supplied to the reducing zone.

Other objects and advantages of the invention will appear as the description proceeds.

In the preparation of iron and similar metals from their oxide ores according to the usual blast furnace practice, it is necessary to use rather elaborate and expensive equipment. The coke is made by distilling raw coal in by-product ovens, which are not only relatively expensive to install but require specific coking types of coals, or mixtures of coking coals, which are not available at all locations which may be served with cheap iron ores. In such operations, even when coking coals and cheap iron ores are available, it is necessary that the coke be quenched and cooled resulting in considerable heat loss before same is transported and charged into the blast furnace.

In the present invention, the raw coal is introduced into the furnace and in the course of its treatment is first transformed to coke particles and continues through to complete gasification and combustion of the coke.

In my preferred form of the invention, I provide tubes or hollow rods that extend through walls into the retort chamber. These roads are preferably hollow to permit the passage of air therethrough. The air so conducted is preheated and is later used for both primary and secondary combustion. Another form of indirect heating which may be employed, is to have high temperature tubes, through which the products of combustion of the blast furnace gases and air, plus recirculated gases to control temperatures, used instead of the rods. In this case the products of combustion pass through the tubes and heat same, more or less after the manner of raising steam in boilers. When such tubes are used the air for combustion is either used without preheating, or heated in some accepted form of external air heating device. As the charge passes downwardly through the reducing zone about the high temperature tubes, it is heated, and, therefore, the coal is distilled and the resulting coked particles react with the oxygen of the ore to bring about reduction at temperatures below that at which agglomerating, sintering, or fusing, takes place. The reduced ore, flux and residual fuel is passed continuously from this chamber into a second chamber that is directly heated by means of combustion of fuel constituents of the charge and air preheated as aforesaid, thereby causing the formation of molten slags and metals and combustible gases which latter are led off from the second or smelting chamber and burned to supply heat indirectly to the charge in the first or reducing chamber.

While my apparatus may be used in various ways, it is particularly adapted to carry out the process described and claimed in my copending application, Serial No. 257,686, filed Feb. 28, 1928. The functions of the various structures will be accordingly described, although it is to be understood that I do not limit the use of this apparatus to the aforesaid process.

For a description of my improved apparatus, reference is made to the following drawing, in which.

Figure 1:
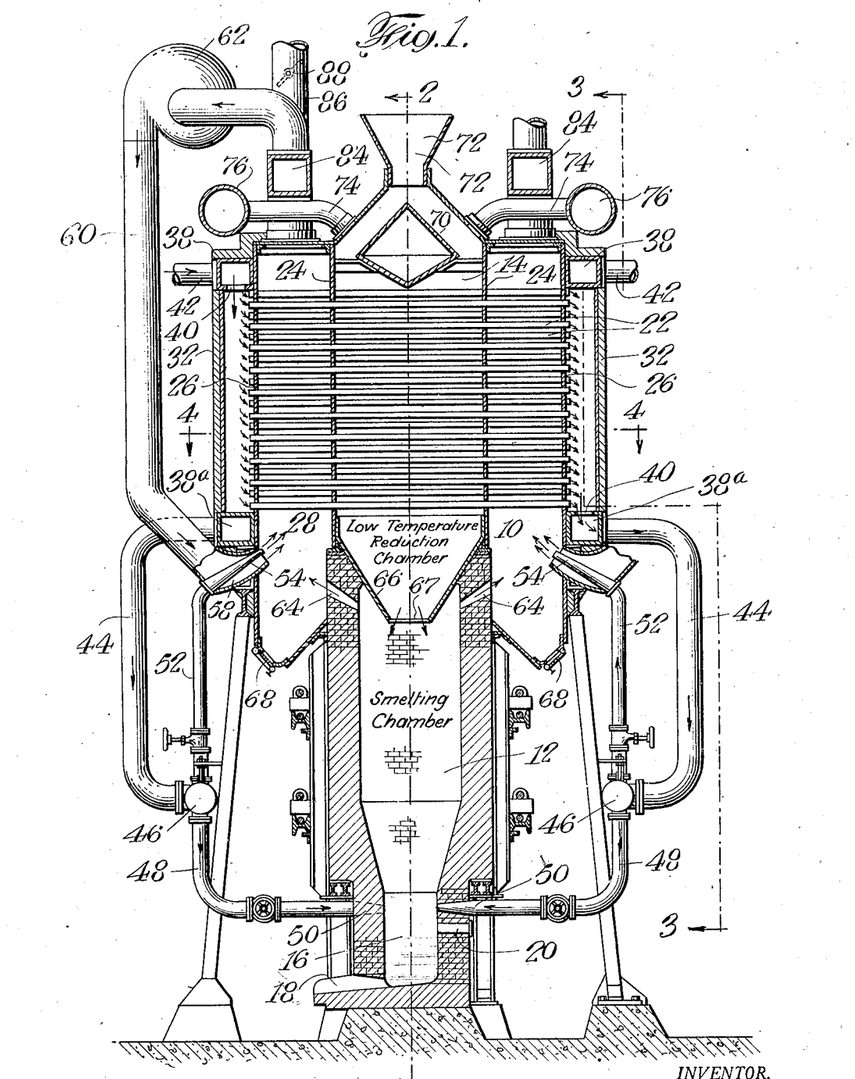
Fig. 1 is a vertical sectional view of a furnace and associated air heating equipment which is an embodiment of the present invention.

Referring to the drawing, 10 is a shaft furnace of rectangular cross-section comprising a lower smelting chamber 12, formed of the usual refractory brick work, and an upper low temperature reducing chamber 14 which may be constructed of metal. The smelting chamber is provided at its lower end with the usual hearth or collecting basin 16 and the usual tap holes 18 and 20 for the metal and slag, respectively. Mounted in the side walls 24 of the reducing chamber and extending across the same are a plurality of tubes 22 for the passage of air. The tubes 22 extend through the side walls and are mounted at their ends in walls 26 parallel to and spaced from the side walls 24 and defining combined combustion chambers and passages 28 therebetween. These tubes are preferably provided with relatively thick walls to facilitate the absorption of heat by the tubes and conduction thereof to the reducing chamber. It is to be noted that, when this particular type of heat transfer is relied upon, the mass of the tubes determines, roughly, the efficiency of the heat transfer to the ore charge. Thus, by providing relatively thick-walled tubes, heat from the gases passing over the portion of the tubes in the combustion chamber is rapidly carried to the charge in the reducing chamber by conduction along the tubes, while at the same time air being led to the tuyères and burners to be presently described is heated to the desired degree as it passes through the tubes.

Disposed in parallel relation to, and spaced from the walls 26 are walls 32. The space defined between each pair of walls 26 and 32 is divided by vertical partitions 34 into a plurality of chambers 36, six being shown by way of example. These chambers communicate with the tubes 22 and alternately communicate with headers 38 and 38$^a$ at the top and bottom, respectively, by means of openings 40. In other words, three alternate chambers 36 on one side of the furnace communicate with the adjacent header 38 and the other three chambers communicate with the adjacent header 38$^a$. It will also be noted that the chambers 36 on the one side of the furnace that are respectively disposed opposite those alternate chambers on the opposite side communicating with the header 38$^a$ for example, communicate in their turn with the adjacent header 38. By this arrangement air introduced into the inlets 42 from a suitable blowing engine is caused to pass through certain sections of the bank of tubes 32 from left to right as indicated by the arrows in Fig. 1, and through alternate sections from right to left. Communicating with the headers 38$^a$ are pipes 44 leading to a bustle pipe 46 from which pipes 48 lead to tuyères 50. Other pipes 52 lead upwardly from the bustle pipe 46 and discharge through nozzles 54 into the lower portion of each of the combustion chambers 28. The nozzles 54 are shown in Fig. 1 as concentrically disposed in discharge outlets 56 from ducts 58 but may discharge separately therefrom. Communicating with the respective ducts 58 are pipes 60 each connected at its opposite and to the upper end of an adjacent combustion chamber and passage 28. A blower 62 is disposed in each pipe 60 for causing return of the relatively cool gases and spent products of combustion to the lower portion of the combustion chamber 28 to control the temperature of the combustion products passed upward over the ends of the tubes 22 therein.

Leading from the upper end of the smelting chamber are outlet passages 64 for the gases evolved during the smelting of the ore. In order to facilitate the discharge of these gases through the passages 64 and assist in preventing their passage upward into the charge in the reducing chamber, a hopper-like member 66 is provided in the lower end of the reducing chamber. This member 66 is provided with a central opening 67 for discharge of the reduced ore and residual fuel from the reducing chamber into the smelting chamber. The downwardly extending portions of the member 66 serve to deflect gases evolved in the smelting chamber upward into the outlet passage 64. As shown, the outlet passages 64 discharge into the lower portion of each of the combustion chambers 28 adjacent the point of discharge of the air inlet nozzles 54. The gases issuing from the smelting zone are relatively rich in combustible constituents and upon mixing with the air introduced through the nozzles 54 they burn, thus supplying heat to the tubes 22 in their passage thereover through the chambers 28. Doors 68 for cleaning and removal of ash, slag or any ore particles that may collect in the bottom of the combustion chambers 28 are provided.

The usual bell 70 and hopper 72 are provided at the top of the reducing chamber, and any suitable means, not shown, for opening and closing the same may be provided. The upper end of the reducing chamber 14 is in communication with pipes 74 leading to gas offtake mains 76 for leading the products of the coal distillation and the reduction of the ore to a gas holder or other means of storage or use.

Figure 4:
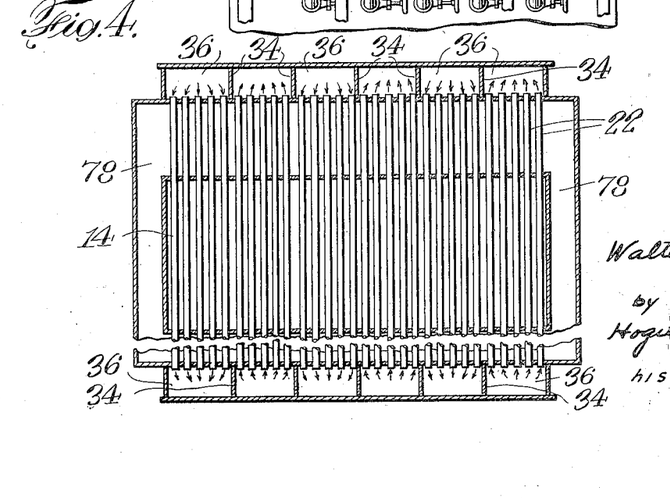
Fig. 4 is a horizontal sectional view through the air preheating and reducing section of the furnace taken on the line 4—4 of Fig. 1.
Figure 5:
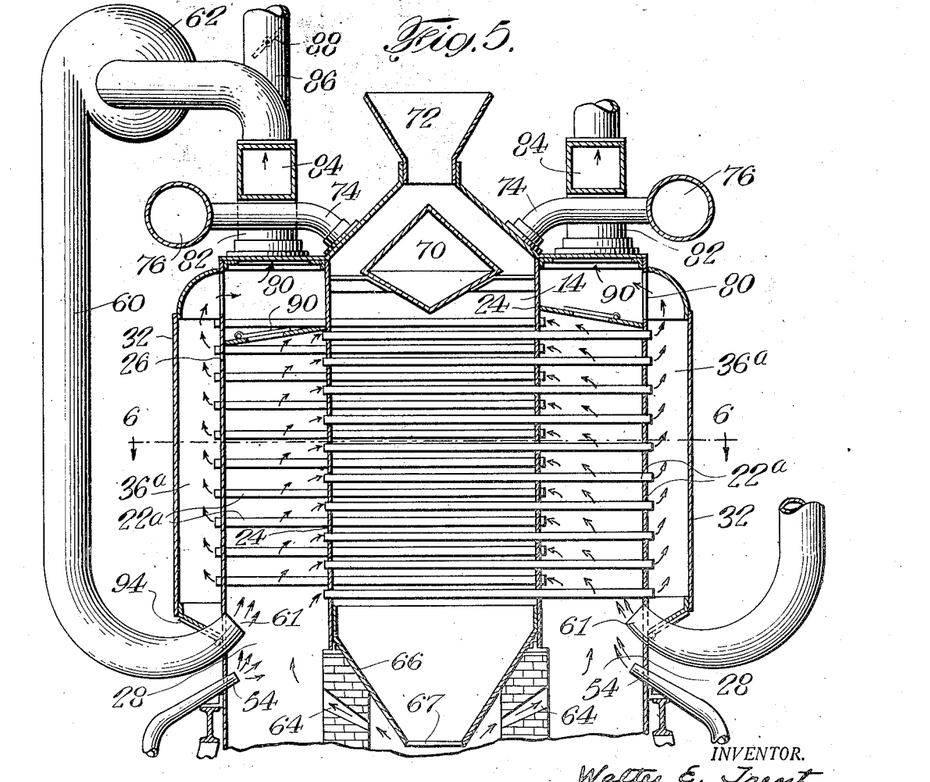
Fig. 5 is a vertical section of the upper portion of the furnace showing a modified form of heating means for the reducing chamber.
Figure 6:
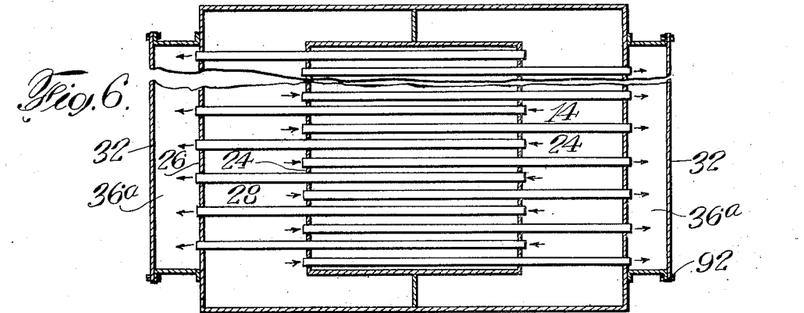
Fig. 6 is a horizontal sectional view taken on the line 6—6 of Fig. 5.

According to the modification shown in Figs. 5 and 6, instead of using the relatively thick walled tubes 22 and providing connections for the passage of air therethrough, I provide tubes 22$^a$ preferably of normal wall thickness disposed across the reducing chamber in the same manner as the tubes 22 shown in Figs. 1-4, inclusive, but arranged in two sets, the tubes in one set each having one end terminating at the wall 24 at the left hand side of the reducing chamber as viewed in Fig. 5 and its other end extending across the combustion chamber 28 adjacent the opposite wall 24 and terminating in the wall 26 separating the adjacent combustion chamber 28 from a passage or flue 36$^a$ formed between the wall 26 and the wall 32; the tubes in the second set extend from the wall 24 on the right hand side of the reducing chamber through such chamber and across the combustion chamber 28 on the left hand side of the furnace. It will be seen that in this way communication is established through the first set of tubes between the combustion chamber 28 on the left side of the reducing chamber and the flue 36$^a$ on the right side, and vice versa, that communication will be established through the second set of tubes between the combustion chamber 28 on the right side and the flue 36$^a$ on the left side of the reducing chamber.

In this modification of my invention it will be seen that I depend for heat transfer on the hot gases passing through the tubes; hence, these tubes are not to be unduly thick, since thin walls will lend themselves more readily to heat transfer. The flues 36$^a$ communicate through openings 80 and passages 82 with headers 84 from which connections lead to blowers 62 and to stack flues 86. In addition to the control of recirculation of the combustion gases which is afforded by the blowers 62, dampers 88 may be inserted in the stack flues 86. In order to further control the transmission of heat to the charge in the reducing chamber, by-pass dampers 90 are provided at the upper ends of the respective combustion chambers 28 to permit part of the combustion products to be diverted directly through the passages 82 and the headers 84 to the stack flue 86. As shown at 92 in Fig. 6, the wall members 32 are removable to permit cleaning of the tubes 22$^a$. Clean out doors 94 are also provided in the lower portions of the flues 36$^a$ for the removal of soot and ash deposits therefrom.

Figure 7:
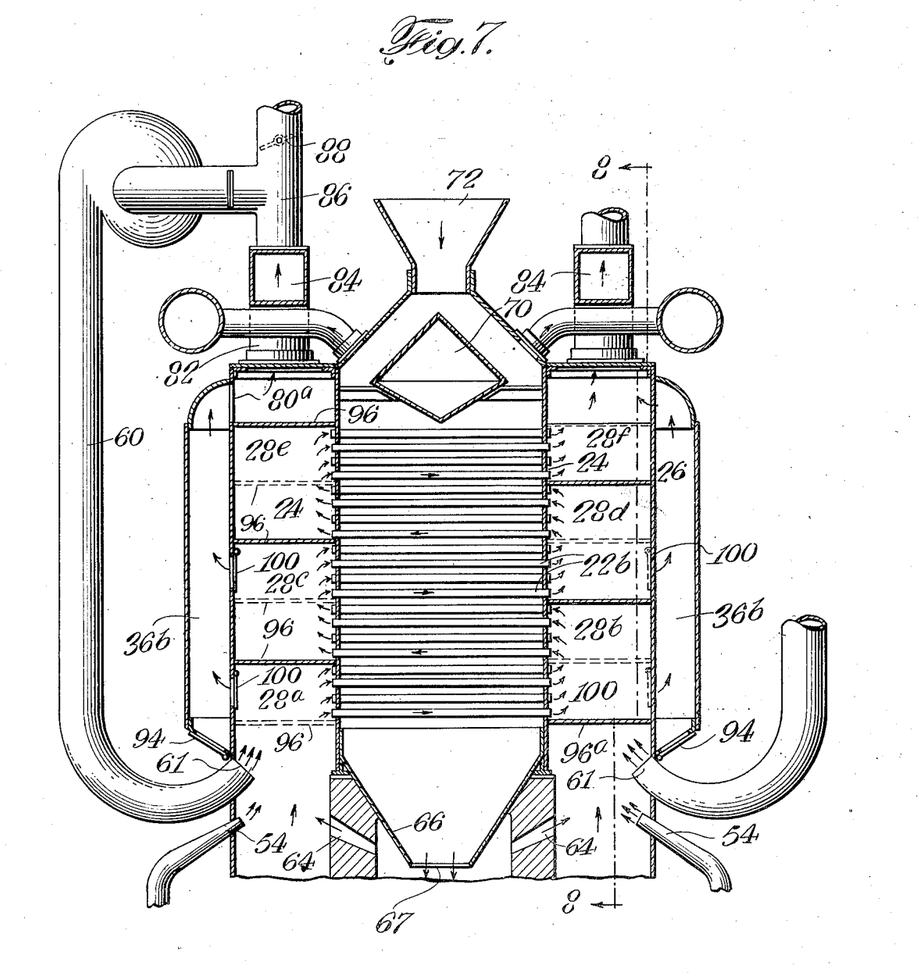
Fig. 7 is a vertical section of the upper portion of the furnace showing still another modification of means for supplying heat to the reducing chamber.
Figure 8:
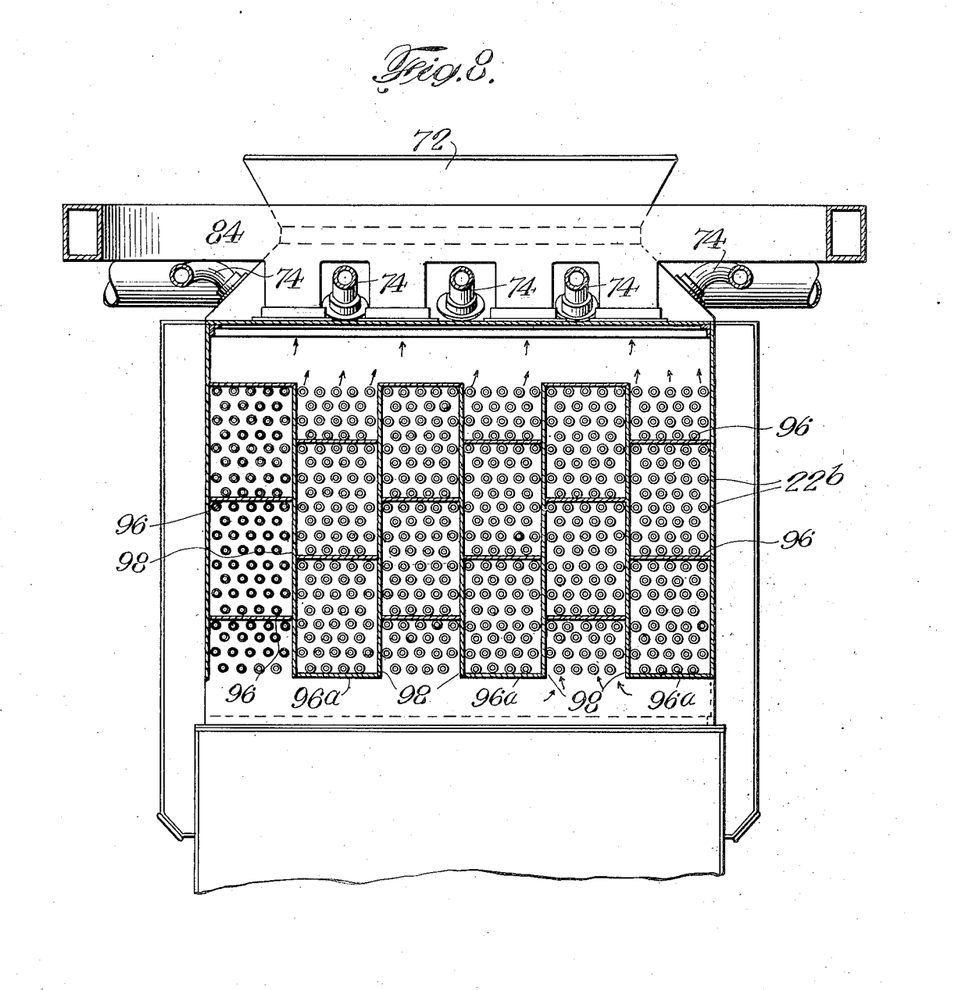
Fig. 8 is a vertical section taken on the line 8—8 of Fig. 7.

According to the modification shown in Figs. 7 and 8, tubes 22$^b$, similar to those shown in Figs. 5 and 6 but only extending across the reducing chamber 14 are provided. Horizontal baffles 96 are disposed in spaces above the respective combustion chambers 28 between the walls 24 and 26, and in order to produce circulation of the combustion gases from both combustion chambers simultaneously back and forth through successive sections of the bank of tubes in the reducing chamber, vertical partitions 98 are also provided for dividing such spaces into a plurality of vertical sections, six being shown in the drawing, the baffles 96 in a given vertical section on one side of the furnace are offset respecting the baffles in the opposite section on the opposite side of the furnace. Alternate vertical sections are also closed off from the adjacent combustion chamber 28 by a horizontal partition wall 96$^a$.

The hot gases produced in the chambers 28 from the combustion of the gases issuing from the smelting zone through the openings 64 and mingling with air, either cold or preheated by any suitable preheating means, issuing from the air blast nozzles 54, are led from the space 28$^a$ into the lowermost tubes communicating therewith and then out into the oppositely disposed chamber 28$^b$. From the chamber 28$^b$ the gases are led back through the next higher section of tubes into the chamber 28$^c$, thence through the next higher series of tubes to the chamber 28ᵈ, thence back through a still higher series to the chamber 28ᵉ and finally through the uppermost series to the chamber 28ᶠ, from which latter they are withdrawn through the passages 82 to the adjacent header 84 and then led either to the stack flue 86 or in part returned through the blower connection and the pipe 60 and discharged into the combustion chamber 28 through the nozzles 61 and caused to recirculate with the combustion gases formed therein and to control the temperature of such gases. With the construction shown, it will be obvious that the transmission of heat from the combustion gases to the ore-coal charge is brought about according to true countercurrent principles, the ore-coal charge being subjected to heat from the relatively cold gases which have given up the greater portion of their sensible heat to the tubes in the lower portion of the reducing chamber, and as the ore-coal charge travels downwardly through the chamber it passes through successively hotter and hotter zones.

In order to afford means for controlling the transmission of heat to the tubes 22ᵇ in addition to the means for recirculating the relatively cool combustion gases I have provided by-pass dampers 100 adapted to divert gases from the chambers 28ᵃ and 28ᶜ to flues 36ᵇ and thence through openings 80ᵃ to the headers 84.

Figure 2:
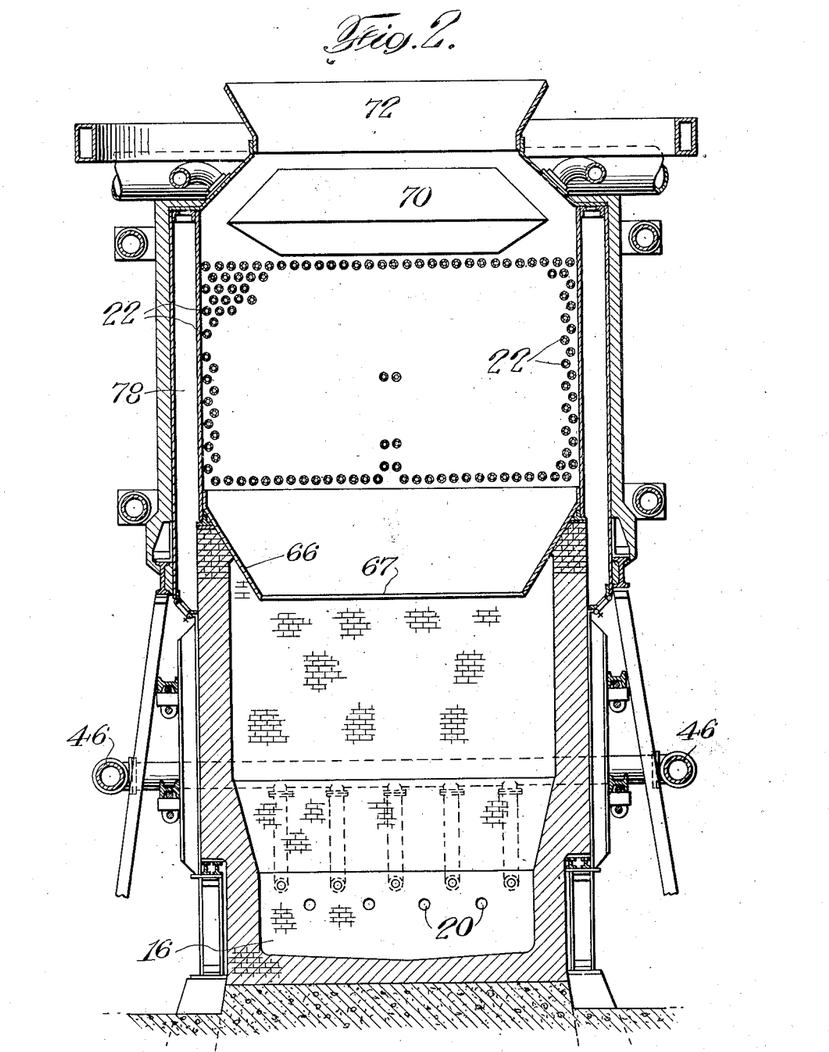
Fig. 2 is a vertical sectional view taken on the line 2—2 of Fig. 1.
Figure 3:
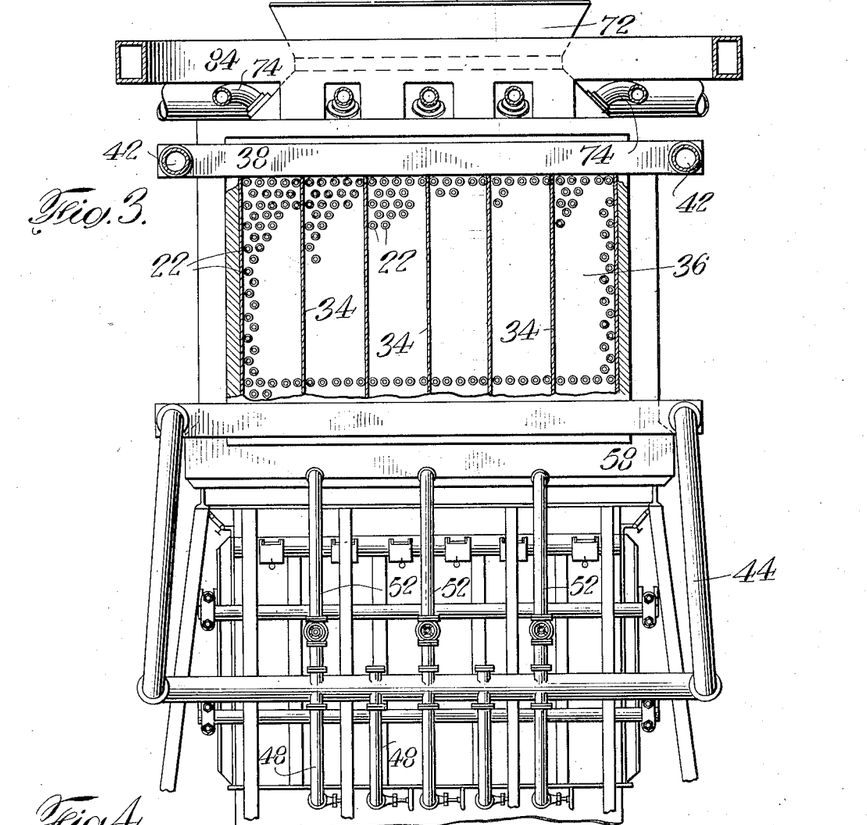
Fig. 3 is a part side elevation and part section taken on the line 3—3 of Fig. 1.

To use my apparatus according to any process previously referred to, the furnace is first blown in in the usual manner by igniting a charge of coke, dry wood or other carbonaceous combustible material in the smelting chamber and then crushed ore (if iron ore, hematite, magnetite or other oxide ore may be used), flux and coal are introduced through the charging hopper 72. The charge, as it is fed downwardly through the reducing chamber, is heated indirectly through the walls 24 and by means of heat conducted along the tubes 22 from the combustion chambers 28, or by heat from the combustion gases passing through the tubes 22ᵃ or 22ᵇ in case the modified forms of apparatus shown in either Figs. 5 and 6 or Figs. 7 and 8 are employed. Passages 78 are also shown in Figs. 2 and 4 for conducting gases from the combustion chambers 28 around the ends of the reducing chamber to supply heat thereto and also insulate the ends of the reducing chamber from the air. The temperatures in the reducing chamber are at all times maintained below that which will cause agglomeration or sintering of the charge and preferably the temperature of the charge is raised gradually and slowly at such a rate as will insure devolatilization of the coal before its normal fusion temperature is reached. As a general rule, the temperature in the reducing chamber should not, even in the lower and hotter portion exceed 1000° F. The temperature of the charge may be kept within the desired limits by controlling the amount of relatively cool gases recirculated through the pipes 60 and mixed with the combustion products resulting from the burning of the air and combustible gases admitted through the nozzles 54 and the passages 64, respectively.

It is not at all essential, of course, that the apparatus be used exactly in the manner indicated. Thus it is not essential that the reduction of the ore be completed within the reduction chamber; it may be completed within the smelting chamber.

By constructing the smelting chamber with the ports 64, 64 avoiding the passage of the gases from this chamber directly into the reducing zone the distance the air blast introduced at the tuyères has to travel through the charge is materially decreased, thus making it possible to operate with materially less pressure on the blast and consequent economy in blowing equipment and power for operating the same. Also, owing to the fact that diluent gases, such as nitrogen introduced with the blast, and carbon dioxide resulting from complete combustion of part of the fuel in the smelting zone, are by-passed around the reducing chamber, the gaseous products which discharge from the reducing chamber will be of high fuel value. Any oil vapors resulting from the coal distillation may also be separated and recovered from the gaseous constituents with much greater facility than would be the case if such separation of the products of the reducing and smelting chambers were not maintained.

This apparatus is adapted to use as a fuel either coking or non-coking coals. Certain of the benefits of my apparatus may also be obtained by the use of coke or carbonized coal particles instead of untreated coal, particularly with respect to the improvement in the heating of the air and the reduction of the pressure required to force the air blast through the charge.

While I have illustrated and specifically described a preferred embodiment of my apparatus, I do not intend to limit myself to the details of construction set forth. Numerous changes might be made by one skilled in the art, and my invention is to be considered as limited only by the prior state of the art and the appended claims.

I claim:

1. In a metallurgical furnace, in combination, a reduction chamber, means for indirectly heating said chamber comprising tubes extending into said chamber, said tubes terminating externally of said chamber and being heated externally of said reduction chamber.

2. In a metallurgical furnace, in combination, a reduction chamber and means for heating said chamber comprising tubes extending into said chamber, said tubes terminating externally of said chamber, and means for bringing hot gases into intimate contact with the portions of said tubes external to said reduction chamber.

3. In a metallurgical furnace, in combination, a reduction chamber, means for indirectly heating said reduction chamber comprising tubes extending into said chamber and terminating externally of said chamber, means for bringing hot gases into intimate contact with said tubes, and means for passing a gas through said tubes.

4. In a metallurgical furnace in combination, a smelting chamber, a reducing chamber adjacent and feeding into the smelting chamber, and means for indirectly heating said reduction chamber comprising tubes extending into and terminating externally of said chamber, said tubes being heated externally of said chamber by the gaseous products of the smelting chamber.

5. In a metallurgical furnace, in combination, a reduction furnace, a smelting furnace, means for indirectly heating said reduction chamber comprising tubes extending into and terminating externally of said reduction chamber, said tubes being heated externally of said chamber by the gaseous products of the smelting chamber, and means for passing a gas through said tubes.

6. In a metallurgical furnace, in combination, a reduction chamber, a smelting chamber, means including tubes for indirectly heating the reduction chamber from the gaseous products of the smelting chamber, means for passing a gas through said tubes, and means for feeding at least a portion of said gas to said smelting chamber.

7. In a metallurgical furnace in combination, a reduction chamber, a smelting chamber, means for withdrawing gases evolved in said smelting chamber at a point intermediate said chambers, vertically spaced tubes extending into said reduction chamber and terminating externally of said chamber, and adapted indirectly to heat said reduction chamber, and means to heat the external portions of said tubes by the gases evolved in said smelting chamber.

8. In a metallurgical furnace, a reduction chamber, a smelting chamber, means for indirectly heating said reduction chamber comprising tubes extending into said chamber, means for withdrawing gases evolved in such smelting chamber at a point intermediate said chambers, means to produce complete combustion of said gases external to said chambers and means for passing resultant products of combustion through said tubes and around a portion thereof indirectly to heat said reduction chamber.

9. In a metallurgical furnace, in combination, a reduction chamber, a smelting chamber, tubes extending into said reduction chamber, means for withdrawing gases from the smelting chamber at a point intermediate said chambers, means for passing the gases through said tubes and means for recirculating at least a portion of said gases through said tubes, to regulate the temperature within said reduction chamber.

10. In a metallurgical furnace, a reduction chamber, a smelting chamber, means for indirectly heating said reduction chamber comprising tubes extending into said chamber, means for producing complete combustion of said gases externally of said chambers, means for passing said gases through said tubes to indirectly heat the reduction chamber and means to by-pass at least a portion of said gases to an external flue.

11. In a metallurgical furnace, in combination, a smelting chamber, a reduction chamber, discharging into said smelting chamber, tubes extending into said reduction chamber, means for heating said tubes from the gases evolved in said smelting chamber, means for withdrawing the gaseous products evolved in said reduction chamber, means for passing a gas through said tubes, and means for discharging at least a part of said gas into the smelting chamber.

12. In a metallurgical furnace, a smelting chamber, a reduction chamber discharging by gravity into said smelting chamber, means for continuously feeding a charge of raw material into said reduction chamber, tubes extending into said reduction chamber, means for leading gases evolved in the smelting chamber into contact with said tubes at a point external to both chambers and means for withdrawing gases evolved in said reduction chamber unmixed with the gases evolved in the smelting chamber.

13. In combination, a smelting chamber, a reduction chamber feeding by gravity into said smelting chamber, combustion chambers adjacent said reduction chamber, means for discharging into said combustion chambers gases evolved in said smelting chambers, means for completing the combustion of said gases in the combustion chambers, means comprising tubes extending into said combustion chambers and into said reduction chamber for transferring heat from said gases to the interior of the reduction chamber, and means for withdrawing the gases evolved in the reduction chamber.

14. In a metallurgical furnace, smelting chamber, a reduction chamber feeding by gravity into said smelting chamber, means for withdrawing gases evolved in said smelting chamber at a point intermediate said chambers, means for causing combustion of said gases, means for leading a part of the products of combustion through said reduction chamber in indirect heating relation with the contents thereof, means for by-passing a portion of said products of combustion, and means for withdrawing separately the gases produced in the reduction chamber.

15. In a metallurgical furnace, in combination, a smelting chamber, a reduction chamber feeding into said smelting chamber, means for withdrawing gases evolved in the smelting chamber at a point intermediate said chambers, means for causing combustion of said gases, means for leading said gases through said reduction chamber in indirect heating relation with the contents thereof, means for recirculating at least a portion of said gases to regulate the temperature of the reduction chamber, and means to withdraw gases evolved in the reduction chamber.

16. A heating apparatus comprising in combination an initial heating chamber and a second heating chamber, a plurality of heat conductive elements positioned in said initial heating chamber and terminating externally thereof, means for removing gases from said second chamber, means for utilizing said gases for heating the portions of said elements disposed externally of said initial heating chamber, and means for passing a gas through said elements and thence into said second chamber.

17. A heating apparatus comprising in combination an initial heating chamber, a second heating chamber and a combustion chamber, a plurality of heat conductive elements positioned in said initial heating chamber and extending into said combustion chamber, means for passing gases from said second heating chamber into said combustion chamber, means in said combustion chamber for burning said gases, and means for passing a gas through said elements and thence into said second chamber.

In testimony whereof, I have signed my name to this specification this 9th day of May, 1928.

WALTER E. TRENT.